US009967988B1

(12) United States Patent
Vroom et al.

(10) Patent No.: US 9,967,988 B1
(45) Date of Patent: May 8, 2018

(54) RETENTION SYSTEM FOR AN ELECTRONIC DEVICE

(71) Applicant: Henge Docks LLC, Arlington, VA (US)

(72) Inventors: Matthew Leigh Vroom, San Francisco, CA (US); Brandon Parod, Alameda, CA (US); Lyle Livingston-Guanzon, San Francisco, CA (US); Laura Mei, Hayward, CA (US)

(73) Assignee: Henge Docks LLC, Arlington, VA (US)

( * ) Notice: Subject to any disclaimer, the term of this patent is extended or adjusted under 35 U.S.C. 154(b) by 0 days. days.

(21) Appl. No.: 15/344,310

(22) Filed: Nov. 4, 2016

(51) Int. Cl.
*A47B 91/00* (2006.01)
*H05K 5/02* (2006.01)
*G06F 3/02* (2006.01)

(52) U.S. Cl.
CPC ......... *H05K 5/0217* (2013.01); *G06F 3/0202* (2013.01); *G06F 3/0213* (2013.01); *H05K 5/0243* (2013.01)

(58) Field of Classification Search
CPC ............... G01R 29/105; H05K 5/0217; H05K 5/02143; G06F 3/0213
See application file for complete search history.

(56) References Cited

U.S. PATENT DOCUMENTS

| | | | | |
|---|---|---|---|---|
| 3,342,183 A * | 9/1967 | Edenbaum | A61L 15/44 | |
| | | | 424/448 | |
| 5,183,230 A | 2/1993 | Walker | | |
| 6,045,098 A | 4/2000 | Timm | | |
| 6,234,085 B1 | 5/2001 | Ramundo | | |
| D451,100 S | 11/2001 | Brillhartl et al. | | |
| D462,360 S | 9/2002 | Gilbertson | | |
| D494,980 S | 8/2004 | Pao | | |
| D588,145 S | 3/2009 | Benden | | |
| D688,675 S | 8/2013 | Vroom | | |
| 9,521,704 B2 * | 12/2016 | Reiffenrath | G01R 29/105 | |
| 9,689,656 B2 * | 6/2017 | Sugawara | G01B 7/002 | |
| 2008/0271615 A1 * | 11/2008 | Viveiros | A41D 19/0051 | |
| | | | 101/34 | |

* cited by examiner

*Primary Examiner* — Amy J. Sterling
(74) *Attorney, Agent, or Firm* — Benjamin E. Maskell

(57) ABSTRACT

Disclosed is a retention system for an electronic device including a base member for receiving the electronic device, a retention pad attached to the base member, a plurality of adhesive portions of the retention pad wherein the adhesive portions are dispersed, generally, in a gradient across the retention pad.

22 Claims, 11 Drawing Sheets

210
220
150
130
146
110
145
100
132
120
170
165
166
131

100
110
120
130
131
132
140
150
160
170
180
190

HENGE • DOCKS
444
446
443
[445]
442
440
441

RETENTION SYSTEM FOR AN ELECTRONIC DEVICE

BACKGROUND OF THE INVENTION

Field of the Invention

The embodiments of the invention relate to a retention system for an electronic device, and more particularly, a device for holding an electronic device substantially from a bottom side. Although embodiments of the invention are suitable for a wide scope of applications, it is particularly suitable for a tray for retaining a keyboard and track pad.

Discussion of the Related Art

The related art includes U.S. Design Pat. No. D688,675 to Matthew L. Vroom ("Vroom"). Vroom discloses a tray for retaining a keyboard and trackpad. As shown in Vroom, upstanding sidewalls of the tray can have overhanging lips that can retain a keyboard and track pad.

The invention of Vroom, however, was conceived for a particular purpose, that is, retaining a keyboard and trackpad having inactive border portions well suited to be held by the overhanging lips of the upstanding sidewalls of the tray. Vroom is not particularly suited for retaining keyboards and particularly trackpads that did not have an inactive border portion because the overhanging lip of the sidewalls would inadvertently activate the trackpad. In particular, one manufacturer, Apple, redesigned its trackpad to omit an inactive border portion.

SUMMARY OF THE INVENTION

Accordingly, embodiments of the invention are directed to a retention system for an electronic device that substantially obviates one or more of the problems due to limitations and disadvantages of the related art.

An object of embodiments of the invention is to provide a tray for retaining an electronic device that does not require the electronic device to have an inactive border portion.

Another object of embodiments of the invention is to provide an easy way to remove the electronic device from the tray.

Yet another object of embodiments of the invention is to provide a rigid tray with reduced manufacturing complexity.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a retention system for an electronic device includes a substantially flat surface for receiving the electronic device, a retention pad on the flat surface, the retention pad having an interface surface for retaining the electronic device, a design on the interface surface, the design comprising a plurality of adhesive portions and a plurality of non-adhesive portions, a first side of the design, a second side of the design opposite the first side wherein a density of adhesive portions is less than a density of non-adhesive portions on the first side than the second side.

In another aspect, a retention system for an electronic device includes a retention system for an electronic device including a base member for receiving the electronic device, a plurality of sidewalls at least partially surrounding the base member, a cutout in base member, the cutout in the base member sized in approximate proportions to allow a human finger to pass therethrough, a retention pad attached to the base member, a cutout in the retention pad; the cutout in the retention pad sized and positioned, generally, to correspond with the cutout in the base member, a plurality of adhesive portions of the retention pad wherein the adhesive portions are dispersed, generally, in a gradient across the retention pad.

In yet another aspect, a retention system for an electronic device includes a retention system for an electronic device including a base member for receiving the electronic device, a retention pad attached to the base member, a plurality of adhesive portions of the retention pad wherein the adhesive portions are dispersed, generally, in a gradient across the retention pad.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Figures 1A, 1B:
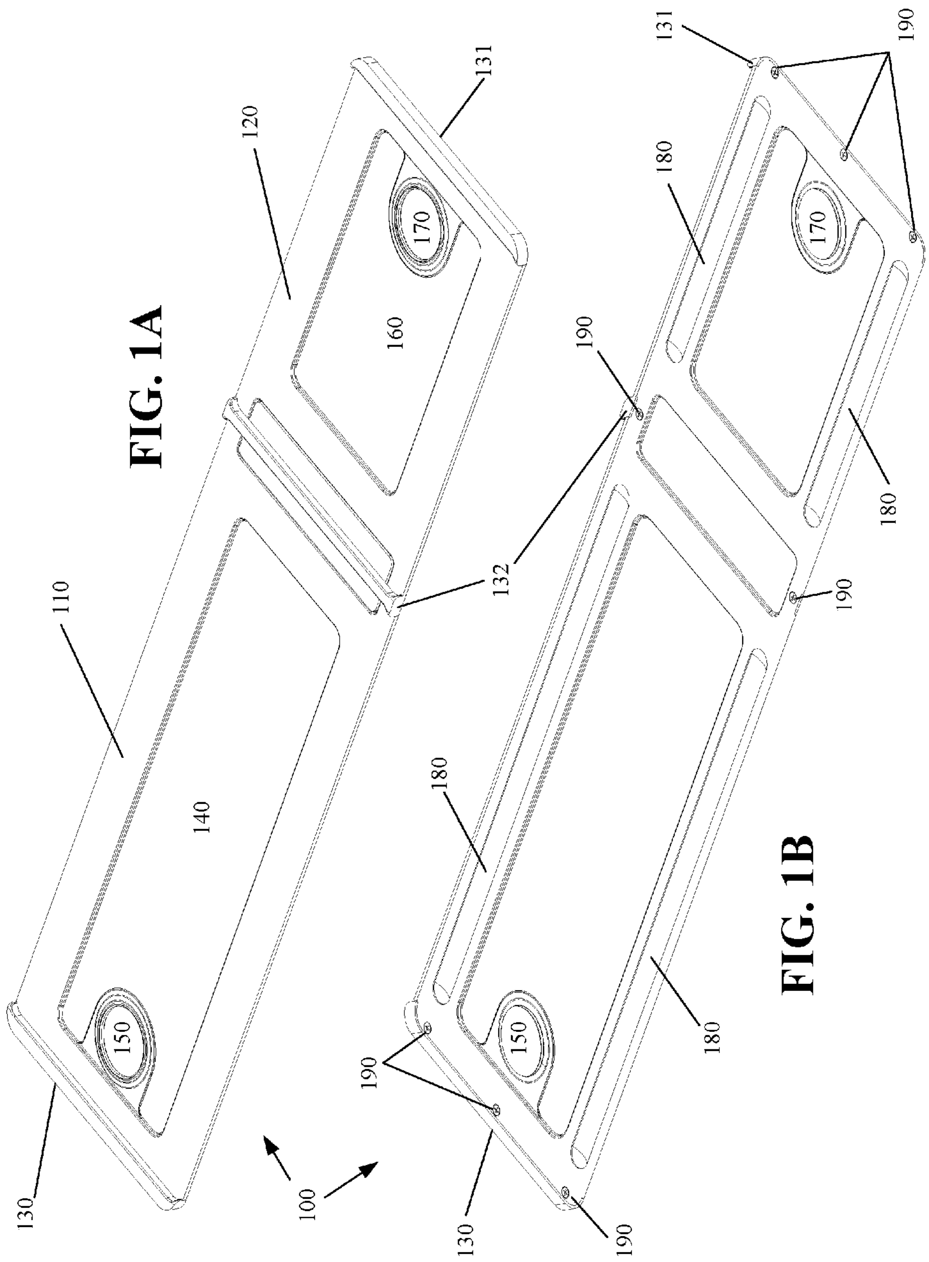
FIG. 1A is an isometric view showing a top side of a retention system for an electronic device.
FIG. 1B is an isometric view showing a bottom side of a retention system for an electronic device.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1A is an isometric view showing a top side of a retention system for an electronic device and FIG. 1B is an isometric view showing a bottom side of a retention system for an electronic device. As shown in FIG. 1A and FIG. 1B, a retention system for an electronic device can include a tray 100 having a first device retention area 110 and a second device retention area 120. The tray 100 can have sidewalls 130 and 131 and a divider wall 132. The tray can have a top side (shown in FIG. 1A) and a bottom side (shown in FIG. 1B). The first device retention area 110 can have a recessed portion 140 and a cutout 150. The second device retention area 120 can also have a recessed portion 160 and a cutout 170. The bottom side of the tray 100 can include a plurality of rubber feet 180. Screws 190 can attach sidewalls 130 and 131 and divider wall 132 to the tray 100.

The tray 100 can be formed substantially from stamped aluminum. The sidewalls 130 and 131 and the divider 132 can be formed from injection molded plastic or aluminum. The recessed portions 140 and 160 can be formed in approximate proportions to receive a correspondingly sized retention pad (not shown).

The cutouts 150 and 170 can be circular (as shown) and be dimensioned in approximate proportions to allow a human finger to pass therethrough. In alternative embodiments, the cutouts 150 and 170 can have other shapes (not shown) such as square, oval, or an elongated slot. In one embodiment, at least one of the cutouts 150 and 170 can have a width that is at least three times its height and the retention pad can completely cover the cutouts.

The cutouts 150 and 170 can be formed near an edge of the corresponding recessed areas 140 and 160. In alternative embodiments, the cutouts 150 and 170 can be formed near an edge of the tray 100. In another embodiment, the cutouts 150 and 170 can intersect or overlap and edge of the tray 100. The cutouts 150 and 170 can completely penetrate the top surface of the tray 100 all the way through to the bottom surface of the tray (shown in FIG. 1B). In another embodiment, the cutouts 150 and 170 can be partial cutouts like a divot or scoop, that do not protrude completely through the tray 100 to the bottom side.

Embodiments of the invention can be adapted to receive a keyboard (not shown) in the first device retention area 110 and a track pad (not shown) in the second device retention area 120. The invention can be considered ambidextrous in that it can be rotated to be suited for either right-handed users or left-handed users without adapting the invention. The embodiment of FIG. 1A is ideally suited for a right-handed user having a keyboard (not shown) in the first device retention area 110 and a track pad (not shown) in the second device retention area 120. The same embodiment of FIG. 1A, however, could be rotated 180 degrees to be ideally suited for a left-handed user that desires to have a track pad on a left side a keyboard.

Rubber feet 180 can be dimensioned to be thicker than the depth of the recessed areas 140 and 160. The recessed areas 140 and 160 can provide rigidity to the tray 100.

Figure 2A:
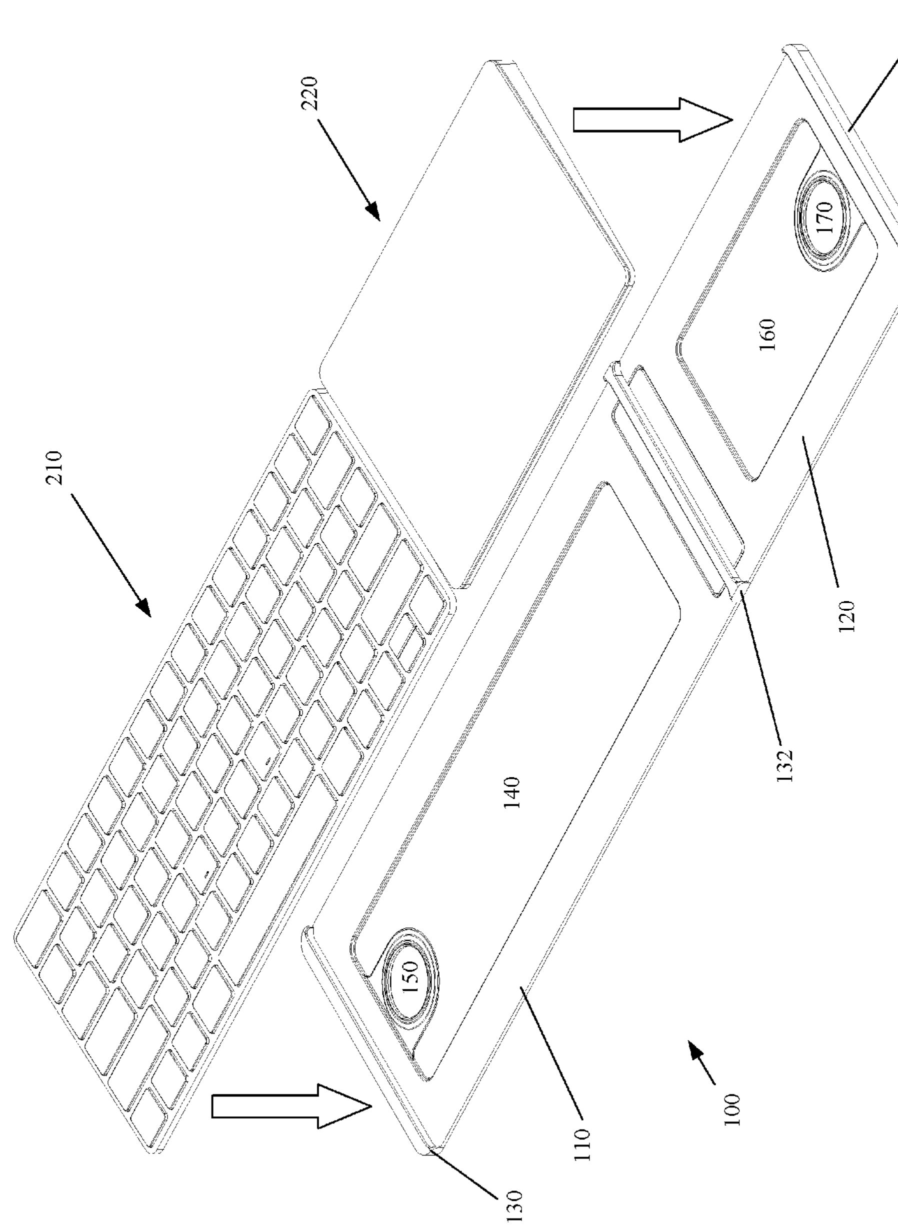
FIG. 2A is an isometric view of a top side of a retention system for an electronic device, a keyboard, and a trackpad.

FIG. 2A is an isometric view of a top side of a retention system for an electronic device, a keyboard, and a trackpad. As shown in FIG. 2A, a retention system for an electronic device can include a tray 100 having a first device retention area 110 and a second device retention area 120. The first device retention area 110 can have a recessed portion 140 and a cutout 150. The second device retention area 120 can also have a recessed portion 160 and a cutout 170. The tray 100 can have sidewalls 130 and 131 and a divider wall 132. The device retention areas 110 and 120 can be sized to receive a keyboard 210 and trackpad 220, respectively. The keyboard 210 can be inserted into the tray 100 by positioning the keyboard 210 between the sidewall 130 and divider wall 132. The trackpad 220 can be inserted into the tray 100 by positioning the trackpad 220 between the sidewall 131 and the divider wall 132.

Figure 2B:
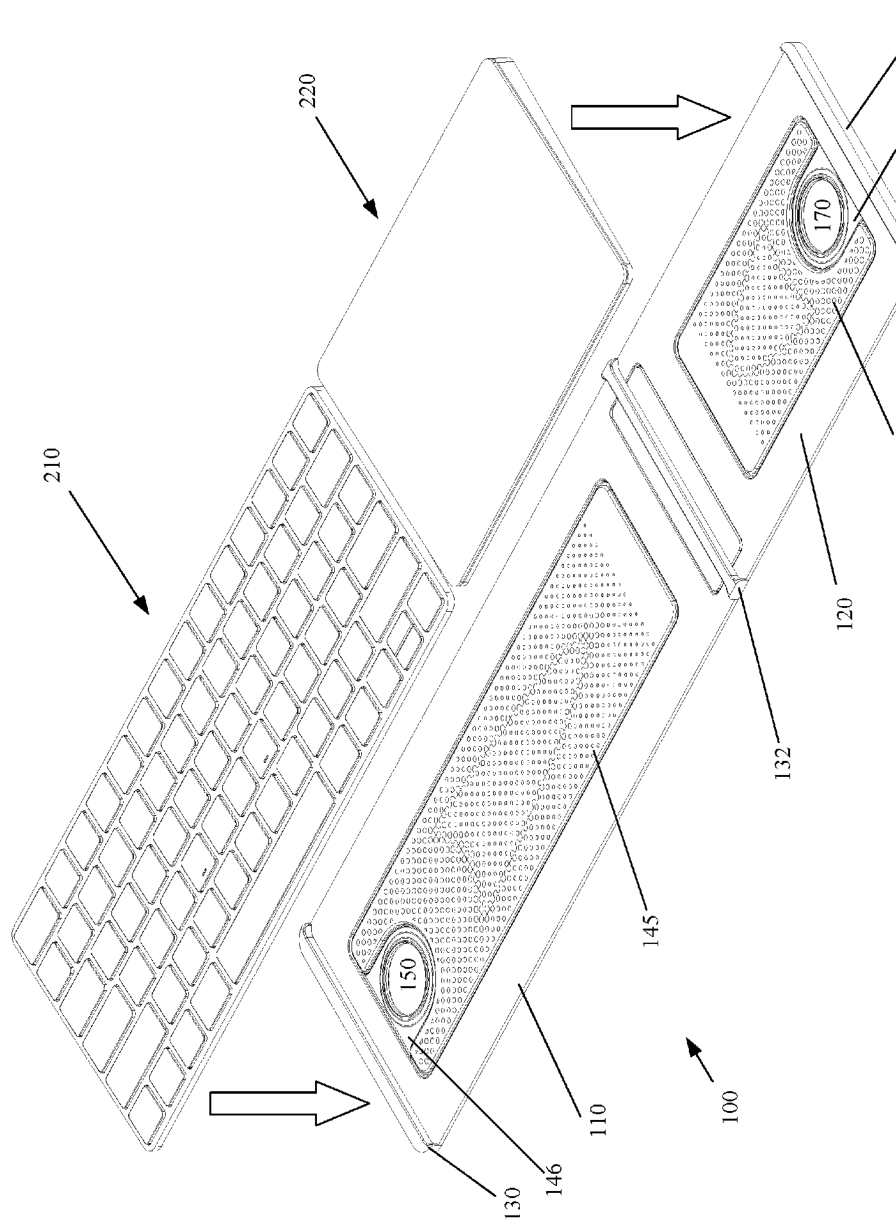
FIG. 2B is an isometric view of a top side of a retention system for an electronic device, a keyboard, a trackpad, and a retention pad.

FIG. 2B is an isometric view of a top side of a retention system for an electronic device, a keyboard, a trackpad, and a retention pad. As shown in FIG. 2B, a retention system for an electronic device can include a tray 100 having a first device retention area 110 and a second device retention area 120. The tray 100 can have sidewalls 130 and 131 and a divider wall 132. The first device retention area 110 can have a recessed area (not labeled) having a cutout 150 and a retention pad 145. The second device retention area 120 can have a recessed area (not labeled) having a cutout 170 and a retention pad 165. The retention pads 145 and 165 can each respectively have a cutout 146 and 166 to correspond generally with the cutouts 150 and 170 in the tray 100. The device retention areas 110 and 120 can be sized to receive a keyboard 210 and trackpad 220, respectively.

The retention pads 145 and 165 can be fixed within the corresponding recessed areas of the tray with glue or other suitable permanent or semi-permanent adhesive. The retention pads 145 and 165 can be formed from injection molded silicone and have a top side (shown) and a bottom side (not shown). The top side can be sticky or tacky to retain an electronic device. In preferred embodiments of the invention, the retention pads 145 and 165 are formed substantially from silicone. The top side of the retention pads 145 and 165 can have patterned surface including sticky portions and not-sticky portions. The sticky or adhesive portions can be formed during the injection molding process. In one embodiment, the molds for the retention pads 145 and 165 can be polished in a pattern and the polished portions can form a glossy finish on the corresponding portion of the resulting retention pads 145 and 165. The non-sticky or non-adhesive portions can also be formed during the injection molding process. In one embodiment, the molds for the retention pads 145 and 165 can further include non-polished or rough portions in a pattern which can form a matte or non-glossy finish on the corresponding portion of the resulting retention pads 145 and 165. The resulting glossy portions of the injection-molded silicone can be sticky or adhesive while the resulting non-glossy portions of the injection molded silicone can be non-sticky or non-adhesive. In another embodiment, the molds (not shown) for the retention pads 145 and 165 can further include protruding portions which can form recessed portions or divots in a pattern on the corresponding portion of the resulting retention pads 145 and 165. The recessed portions or divots of the retention pads 145 and 165 would not touch an electronic device placed on the retention pads 145 and 165 and create an area of lower adhesion or lower stickiness in comparison to other surfaces of the retention pads.

Figure 3A:
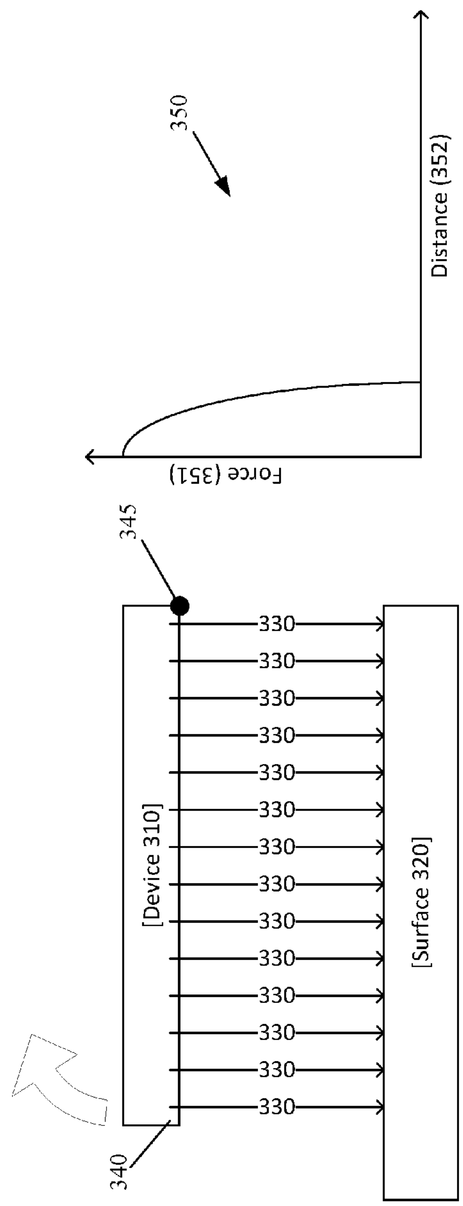
FIG. 3A is a simplified illustration of the force needed to hingedly remove an electronic device from a uniform adhesive surface and a corresponding force graph.

FIG. 3A is a simplified illustration of the force needed to hingedly remove an electronic device from a uniform adhesive surface and a corresponding force graph. FIG. 3A illustrates, in a simplified form, the force needed to hingedly remove a device 310 from a uniform adhesive surface 320. In this context, "hingedly remove" means that the device 310 is lifted at one side (e.g. the left side 340) causing a hinge point 345 to form on the opposite side (e.g. the right side). In this context "uniform adhesive surface" means a surface that has a mostly uniform distribution of stickiness across its surface (e.g. double-sided tape). Although the device 310 and the surface 320 are shown separated by force arrows 330, this distance is exaggerated for clarity and, in embodiments of the invention, the device 310 and the surface 320 are touching or nearly touching.

As shown in FIG. 3A the arrows 330 represent the force, at the given point, between the adhesive surface 320 and the device 310. The arrows 330 are mostly equal in length because the adhesive surface 320 in FIG. 3A is uniform. Assuming both the surface 320 and the device 310 are mostly rigid, a great amount of force is needed to hingedly remove the device 310 because one must essentially overcome all of the adhesive force at once. The force graph 350 on the right of FIG. 3A illustrates the amount of force 351 needed to hingedly remove the device 310 as a factor of distance 352. Initially, a great force is needed to overcome the adhesive force of the adhesive surface 320. However, as the device 310 is hinged away from the adhesive surface 320, the device 310 is quickly separated from the adhesive surface 320 and the force drops off quickly.

In a practical application, this force distribution can have some undesirable results. First, the amount of force needed to begin remove of the device is great. Second, because the needed force drops off quickly, it can be a challenge of dexterity to hold the device and maintain control of the removal. To a user, the user would initially pull hard and then the device 310 would suddenly release possibly causing the device 310 to fall from the user's hands potentially damaging the device 310.

Figure 3B:
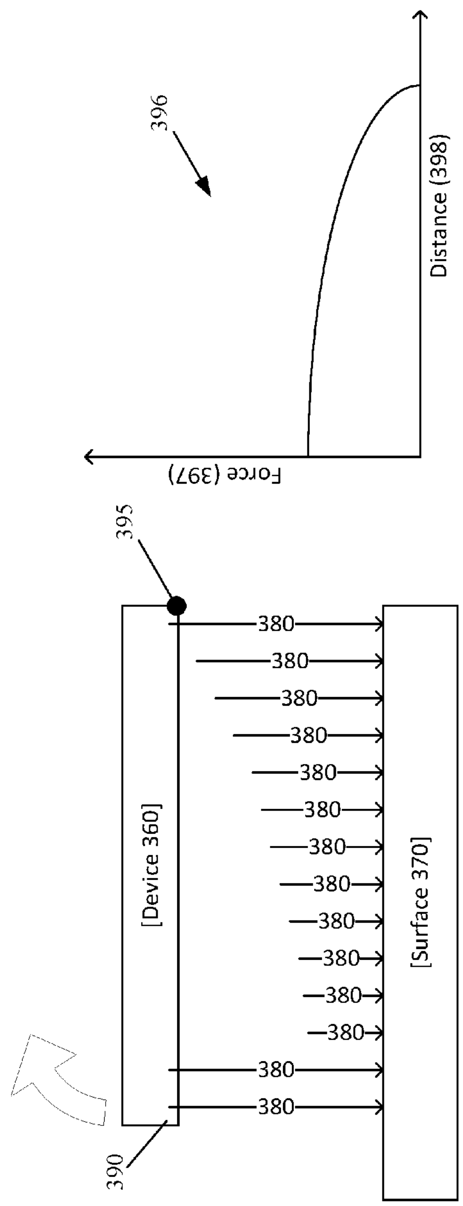
FIG. 3B is a simplified illustration of the force needed to hingedly remove an electronic device from an adhesive surface according to an embodiment of the invention and a corresponding force graph.

FIG. 3B is a simplified illustration of the force needed to hingedly remove an electronic device from an adhesive surface according to an embodiment of the invention and a corresponding force graph. FIG. 3B illustrates, in a simplified form, the force needed to hingedly remove a device 360 from an exemplary non-uniform adhesive surface 370. In this context, "hingedly remove" means that the device 360 is lifted at one side (e.g. the left side 390) causing a hinge point 395 to form on the opposite side (e.g. the right side). In this context "non-uniform adhesive surface" means a surface that has a mostly non-uniform distribution of stickiness across its surface (e.g. rows of double-sided tape having spaces between them). Although the device 360 and the surface 370 are shown separated by force arrows 380, this distance is exaggerated for clarity and, in embodiments of the invention, the device 360 and the surface 380 are touching or nearly touching.

As shown in FIG. 3B the arrows 380 represent the force, at the given point, between the adhesive surface 370 and the device 360. The arrows 380 are varied in length because the adhesive surface 370 in FIG. 3A is non-uniform. As will be discussed in greater detail in conjunction with FIGS. 4A-4F, a non-uniform adhesive "interface surface" can be created that has a different degree of stickiness at various points throughout the surface. In the example surface of FIG. 3B, assuming both the surface 370 and the device 360 are mostly rigid, a relatively large force is needed to initially begin hingedly removing the device 360 because one must essentially overcome the left-most adhesive forces. However, as the two surfaces begin to separate, the force quickly drops off before increasing again at the right-hand-side. The force graph 396 on the right of FIG. 3A illustrates the amount of force 397 needed to hingedly remove the device 360 as a factor of distance 398. Initially, a great force is needed to overcome the adhesive force of the adhesive surface 370. However, as the device 360 is hinged away from the adhesive surface 370, the device 360 is separated from the adhesive surface 370 and the force drops off gradually.

In a practical application, this force distribution can have result in a pleasurable user experience. First, the amount of force needed to begin remove of the device is great, but not as great as in FIG. 3A. This is denoted by the total magnitude of lines 330 being greater than the total magnitude of force lines 380. This causes the device 360 to feel securely mounted to the adhesive surface 370. Second, because the needed force drops off gradually, it is easier for a user to control the removal of the device 360 from the surface 370. To a user, the user would initially pull hard and then the device 360 would then slowly peel away from the surface 370.

In designing an adhesive surface, such as that described in conjunction with FIG. 3B, there are some generalized design criteria that can be applied to create a pleasurable user experience. First, as previously noted, when a device is on the adhesive surface, it should feel securely attached to the user. Because the two devices are mostly rigid (i.e. they flex a little bit), the adhesive force can be approximately measured by the total magnitude of the adhesive force vectors 380. The device is described as "hingedly removed" because in practice, a user will remove a device from a surface by holding the surface in one hand and lifting an edge of the device with the other hand. When the user begins to hingedly remove the device from the surface, both the device and the surface will flex to some small degree causing the two to feel like they are being peeled apart (See, e.g. FIG. 3C). An important design consideration is to ensure that the degree of adhesion is not so strong that the hinged removal of the device will damage the device by bending or breaking. To protect from over adhesion, the stickiness of the adhesive surface can be lowered in a middle portion. In that way, less force is required to hingedly remove the device through the middle and the device is less likely to be damaged by bending. By the same token, the easier it is to remove a device, the more control a user will have over the removal, thereby reducing the likelihood of accidental breakage from dropping after sudden release of the device from the adhesive surface. These and other design considerations guide the various embodiments of the adhesive pads described in conjunction with FIGS. 4A-4F.

Figure 3C:
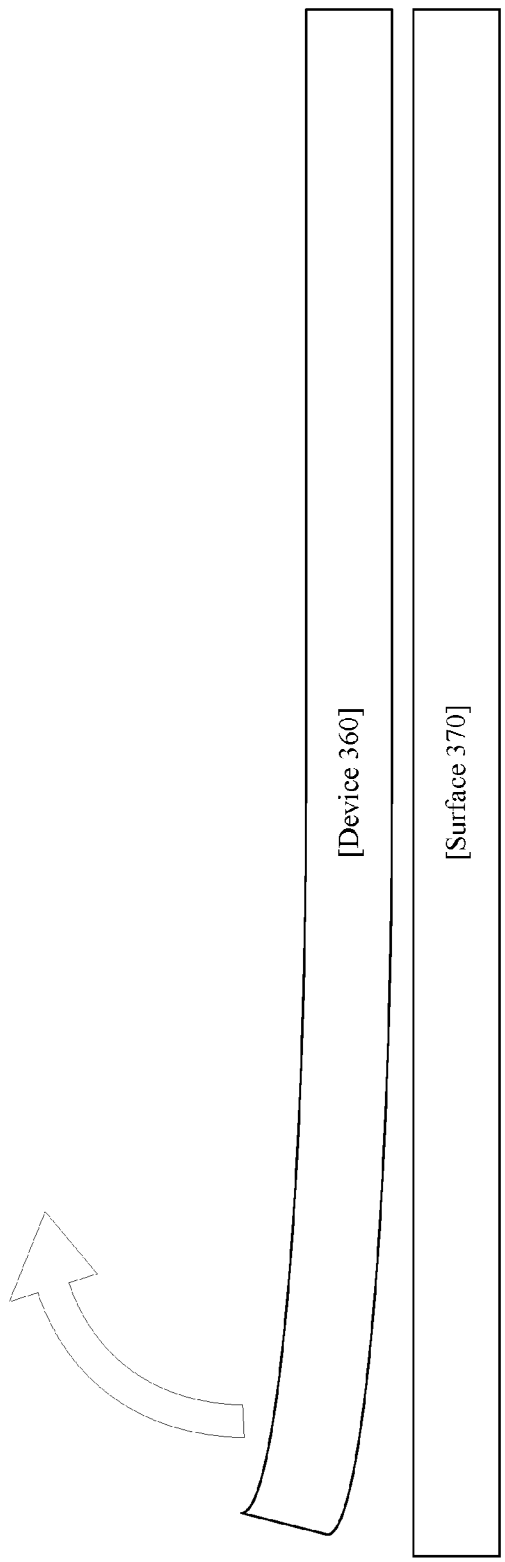
FIG. 3C is an illustration of the concept of peeling and hinged removal of a device according to an embodiment of the invention.

FIG. 3C is an illustration of the concept of peeling and hinged removal of a device according to an embodiment of the invention. As shown in FIG. 3C, a device 360 can be peeled away from an adhesive surface 370. Although the device 360 and the surface 370 have been shown with a slight separation throughout, this is for illustrative purposes only to more clearly delineate the edges of the shapes in the illustration. The device 360 can be, for example, a keyboard or a track pad. The device can be mostly rigid, but susceptible to minor flexing and bending in response removal from the adhesive surface 370. Removal of the device can begin at a left side by pulling the two structures apart. Because the device 360 flexes somewhat, the pulling apart of the devices at one side can cause the device 360 to flex and feel like it is being peeled away from the adhesive surface 370. The amount of force required to remove the device 360 from the pad 370 is a function of the surface area of the device 360 that is in contact with the adhesive pad 370, the rigidity of the device 360 (e.g. the degree of bendiness) and the stickiness of the pad 370. If the device 360 were completely flexible, the force needed to remove the device 360 at any given point would be equal to the force to overcome the stickiness of the pad 370 at exactly that point. For 100% rigid devices, the force required to remove the device 360 from the pad 370 is equal to the sum of the force required to remove the device from all points at once. Embodiments of the invention are directed to providing a stickiness profile for the adhesive pad 370 given the inherent slight flexibility of the device 360 that strikes a balance between ease of removal, secure retention, and control and "feel" while removing the device.

FIGS. 4A-4F are illustrations of exemplary patterns for a retention pad according to embodiments of the invention. In FIGS. 4A-4F light or white portions can represent areas of low adhesion and black or dark areas can represent areas of high adhesion. As discussed above, in preferred embodiments the retentions pads can be formed primarily from molded silicone. Polished portions of the mold for the molded silicone can form a glossy finish on the resulting retention pad which can have adhesive properties. Unpolished or matte finish portions of the mold can form textured or matte-finish portions on the retention pad which can be less adhesive than the glossy-finish portions. An another embodiment, divots or recessed portions can be formed in the molded silicone. Divots and recessed portions can be formed below the surface of the retention pad so that an electronic device does not come into contact with the recessed or devoted portions of the retention pad when placed there on. The lack of contact in these recessed or devoted portions can create areas of low-adhesion or no-adhesion. The drawings presented as FIGS. 4A-4F are illustrative in nature and the non-sticky portions are simply indicated as light or white areas for the purpose of drawing distinction from the dark-colored sticky portions. These light or white areas are not indicative of any particular type of non-sticky surface and can be matte-finish, divots, recessed portions, or other non-sticky features. Similarly, sticky or adhesive portions have been described as corresponding to polished portions of a mold. The areas illustrated as dark portions in FIGS. 4A-4F are not limited to glossy-finish portions of silicone and those of skill in the art will appreciate that other means of creating sticky portions could be substituted to achieve similar results.

The embodiments of FIGS. 4A-4F have varying densities of sticky material disposed in a gradient across the surface of the retention pad. One feature of the embodiments of FIGS. 4A-4F is the prevention of an uncontrolled release of the electronic device from the retention pad. An uncontrolled release can be an undesirable feature that is all-to-familiar to the layman: when two surfaces are stuck together and a force is applied to separate the two surfaces (e.g. pulling), the two surfaces can suddenly and uncontrollably separate thereby causing one or both surfaces to slip from a user's hand potentially causing damage. The embodiments of FIGS. 4A-4F provide a controlled release of two surfaces that are stuck together and the various embodiments provide different "release profiles" as will be described in conjunction with each of FIGS. 4A-4F.

Figure 4A:
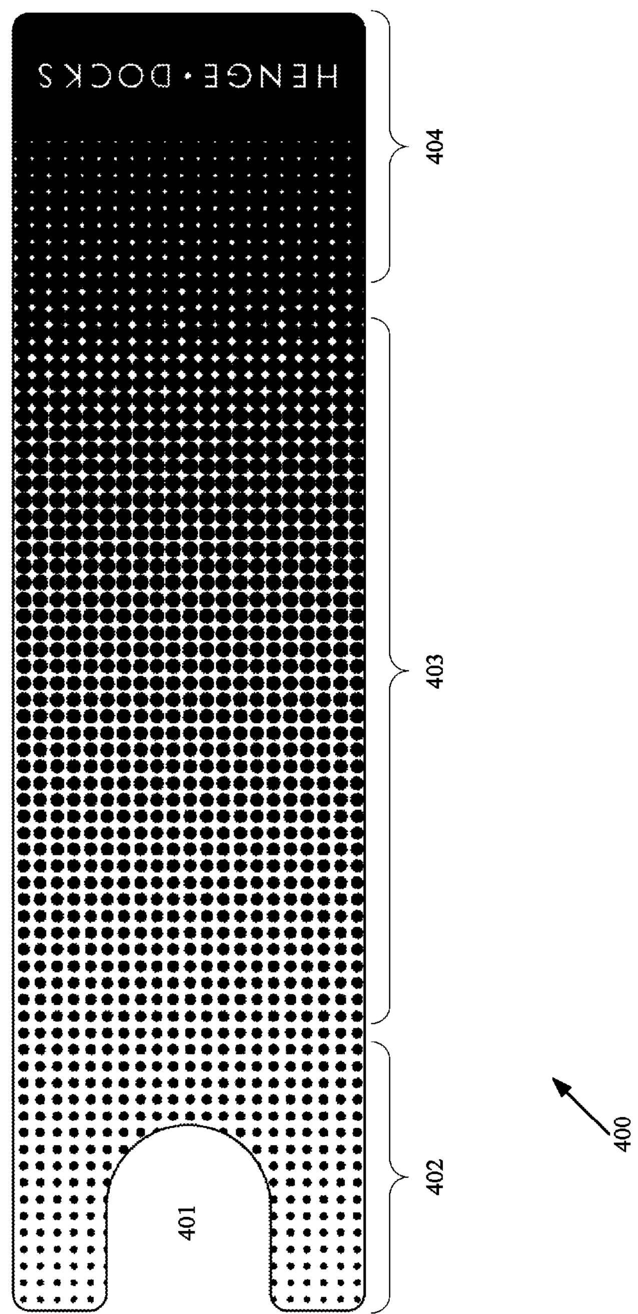
FIG. 4A is an illustration of a retention pad according to an embodiment of the invention.

FIG. 4A is an illustration of a retention pad according to an embodiment of the invention. The retention pad of FIG. 4A can represent a most simplified embodiment. As shown in FIG. 4A, a retention pad 400 can have a cutout 401, an area of low density sticky portions 402, and area of medium density sticky portions 403, and an area of high density sticky portions 404. The cutout 401 can correspond to a cutout or other feature in a tray (e.g. FIG. 2B, element 150). Although the areas of sticky portions are described as discrete areas of low, medium, and high areas of stickiness, it should be appreciated that these areas are identified as discrete areas solely for the purpose of describing the embodiment illustrated in FIG. 4A. In preferred embodiments of the invention (and as depicted in FIG. 4A) the density of sticky areas increases in a gradient from the left side of the retention pad 400 near the cutout 401 to the right side of the retention pad 400.

The area of low density sticky portions 402 can correspond generally to the area of the cutout 401. The density of sticky portions can increase gradually to the area of medium density sticky portions 403 to the area of high density sticky portions 404.

When removing an electronic device from the adhesive pad 400 of FIG. 4A, the electronic device is initially in contact with the entire pad 400 and the force required to overcome the stickiness and remove the electronic device from the pad 400 can be great. A user can begin to remove the electronic device near the cutout 401. The electronic device is assumed to be very rigid, but still will flex or bend somewhat during removal. This flexed or bending removal can correspond to feeling of peeling off a sticker. The area of low density sticky portions 402 is provided so that the peeling and hinged removal of the device can begin with relative ease. After the electronic device is pulled away from the area of low density sticky portions 402, the user must next pull or peel the device away from the area of medium density sticky portions 403. This increased density in the area of medium density sticky portions 403 causes the area to be more-sticky and present more resistance to the user at this point. However, because of the peeling and hinged nature of the removal of the electronic device, the removal force from the perspective of the user feels the same. This is because at the moment of initial removal, the user must overcome nearly all of the adhesive force between the device and the left had areas of the pad. However, as the user peels the device away from the pad, less of the pad is in contact with the device and less force is required to continue removal. To prevent the electronic device from "popping" off the pad in an uncontrolled release, the areas of medium and high density sticky portions 403, 404 are provided to increase stickiness later in the removal of the device from the pad 400. Near the end of the removal process, most of the electronic device is separated from the pad and only the area of high density sticky portions 404 is in contact with the electronic device. At this point, the user has considerable leverage because the pad 400 and the device have been mostly separated and the user can grip more portions of the electronic device by sliding fingers between the device and the retention pad 400. The area of high density sticky portions 404 can present the stickiest area of the retention pad 400 because the user has the most leverage, mechanical advantage and because the smallest amount of the pad is in contact with the device at this point.

FIGS. 4B-4F describe further embodiments of this concept of a retention pad having a gradient of sticky surfaces with additional features to address design and user experience criteria.

Figure 4B:
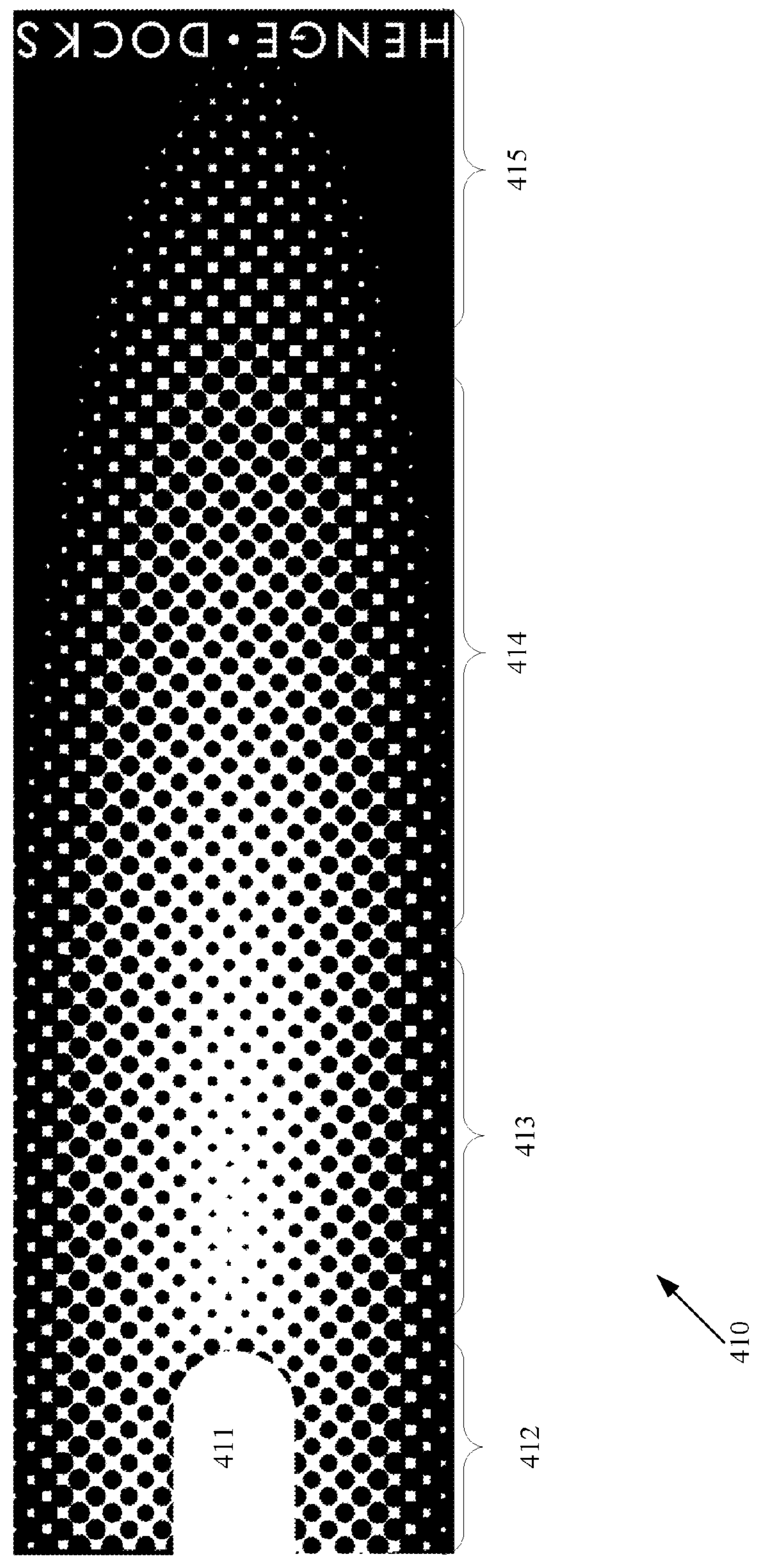
FIG. 4B is an illustration of a retention pad according to an embodiment of the invention.

FIG. 4B is an illustration of a retention pad according to an embodiment of the invention. As shown in FIG. 4B, a retention pad 410 can have a cutout 411, a first area sticky portions 412, a second area sticky portions 413, a third area sticky portions 414, and a fourth area sticky portions 415. The cutout 401 can correspond to a cutout or other feature in a tray (e.g. FIG. 2B, element 150). Although the areas of sticky portions are described as discrete areas, it should be appreciated that these areas are identified as discrete areas solely for the purpose of describing the embodiment illustrated in FIG. 4B. In preferred embodiments of the invention (and as substantially depicted in FIG. 4B) the density of sticky areas increases in a gradient from the left side of the retention pad 410 near the cutout 411 to the right side of the retention pad 410.

The retention pad 410 can further include a border region (not labeled) of sticky areas along its edges. In FIG. 4B, these border regions are illustrated as mostly-solid dark areas along three edges (top edge, bottom edge, and right edge). The border region can securely hold an electronic device at its edges so that the device does not feel loose at any point. At the same time, because the border region is relatively thin at most points, the adhesive force can be overcome with reasonable effort.

The retention pad 410 can further include an interior area (not labeled) of low-density of sticky portions. The interior area can have a mostly parabolic shape. The density of sticky portions can be less inside the parabola than outside the parabola. In relative terms, the total density of sticky portions can be medium in the first area 412, low in the second area 413, medium in the third area 414, and high in the fourth area 415.

The area 412 and cutout 411 can correspond to an area where removal of the electronic device desirably begins. As shown in FIG. 4B, the density of adhesive areas is medium in comparison to the immediately adjacent region 413. Although the density is described as medium in the area 412, the force to remove an electronic device in this area can be approximately equal to that of the area 413 because the total adhesive force of the area 412 is reduced by the area of the cutout 411.

The density of stick areas can gradually increase from area 413 to area 414 to area 415. This gradual increase of density of sticky areas can create a smooth release profile for an electronic device on the retention pad 410. The sticky areas (depicted in black) can be disposed in a parabolic-shaped gradient having a lower density of sticky portions inside the parabola than outside the parabola. From inside the parabola, the sticky areas can increase in density in a gradient as they approach the parabola.

Figure 4C:
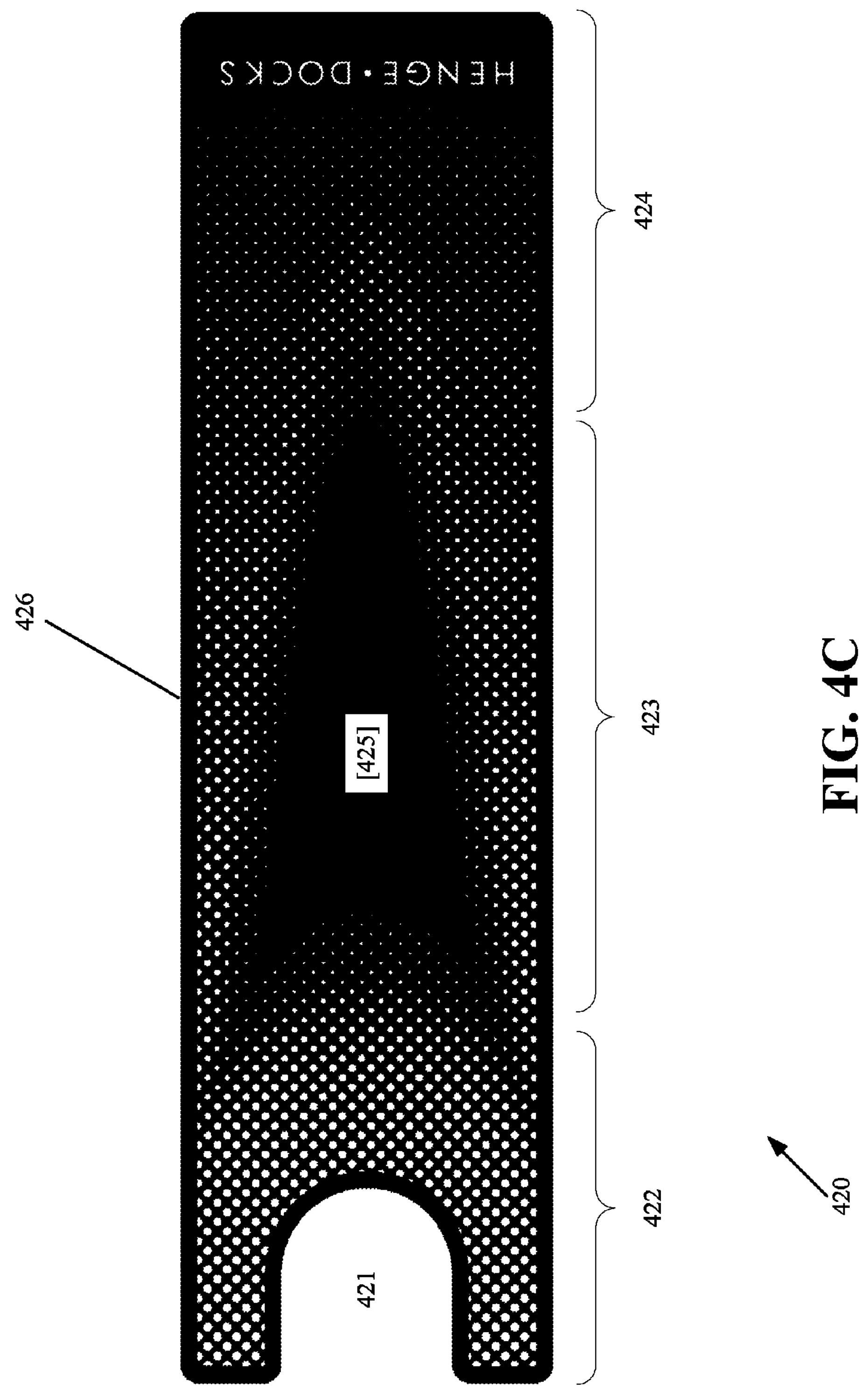
FIG. 4C is an illustration of a retention pad according to an embodiment of the invention.

FIG. 4C is an illustration of a retention pad according to an embodiment of the invention. As shown in FIG. 4C, a retention pad 420 can have a cutout 421, sticky areas 422, 423, and 424, and border area 426. Sticky area 423 can include an inner feature 425. Although the areas of sticky portions are described as discrete areas, it should be appreciated that these areas are identified as discrete areas solely for the purpose of describing the embodiment illustrated in FIG. 4C. The density of sticky areas generally increases in a gradient from the left side of the retention pad 420 near the cutout 421 to the right side of the retention pad 420.

The cutout 421 can correspond, generally, to the location of a matching feature on a tray associated with the retention pad 421 (e.g. FIG. 2B, element 150).

The retention pad 420 can further include a border region 426 of sticky areas along its edges. In FIG. 4C, these border regions are illustrated as mostly-solid dark perimeter of the retention pad 420. The border region can securely hold an electronic device at its edges so that the device does not feel loose at any point. At the same time, because the border region is relatively thin at most points, the adhesive force can be overcome with reasonable effort.

The retention pad of FIG. 4C can have a generally even, parabolic-shaped gradient as similar to that disclosed in conjunction with FIG. 4B, but can further include the inner feature 425. The retention pad can have a relatively low density of sticky portions in area 422 closest to the cutout 421. The retention pad can have a relatively higher or "medium" density of sticky portions in area 423 near the middle of the pad 420. The retention pad can have a relatively high or highest density of sticky portions in area 423 on a right side of the pad 420.

The inner feature 425, can be used to alter the release profile when an electronic device is removed from the provide. The inner feature 425 can generally be congruent to the parabolic gradient. In the embodiment of FIG. 4C, the inner feature 425 is also substantially parabolic. In embodiments where the inner feature 425 is a high-density of sticky portions such as shown in FIG. 4C, more force can be required to remove an electronic device compared to the embodiment of FIG. 4B.

From the perspective of the user peeling away a device starting near the cutout 421, initially, minimal force can be required to begin removal of an electronic device from the pad 420 because the cutout 421 represents a large area of no sticky portions and the density of sticky portions in area 422 is relatively low. However, when the device is partially removed, continued removal can require dramatically more force because of the solid inner feature 425 near the right side of area 423. Because of the generally congruent parabolic shape of the inner feature 425, however, further removal of the electronic device from the pad 420 requires less force because of the decreasing size of inner feature 425, decreasing relative density of sticky areas near the right side of area 423, and increased mechanical advantage. The area 424 can include a very dense distribution of sticky material. Although the density can be very high, the total force required to remove the device from this last area 424 can be modest because the area is small in comparison to the total area of the retention pad 420 and because the user will have considerable mechanical advantage at this point. The high density of sticky material in the area 424 can act as an emergency stop to prevent an uncontrolled release of the electronic device from the retention pad 420.

Figure 4D:
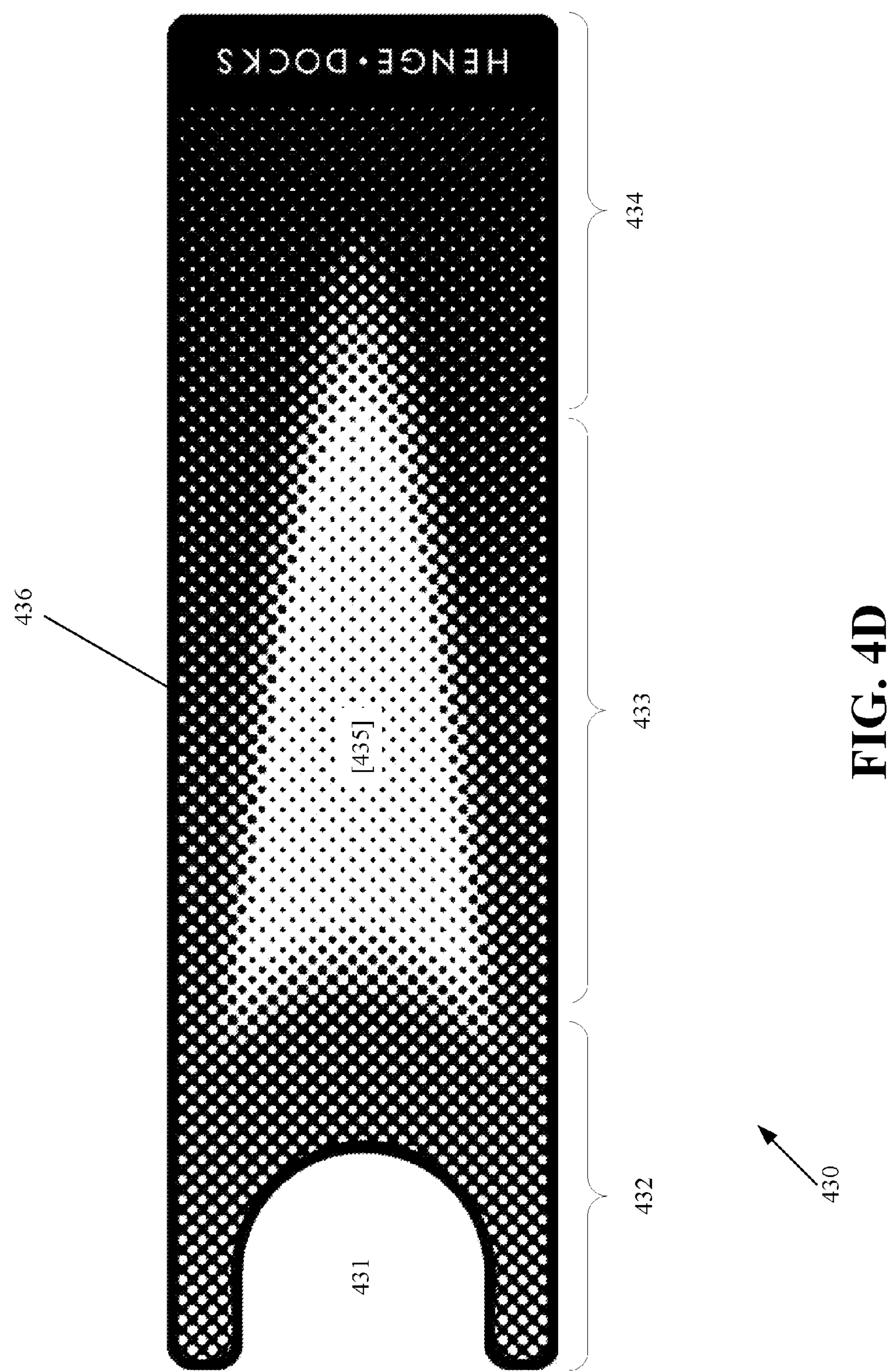
FIG. 4D is an illustration of a retention pad according to an embodiment of the invention.

FIG. 4D is an illustration of a retention pad according to an embodiment of the invention. As shown in FIG. 4D, a retention pad 430 can have a cutout 431, sticky areas 432, 433, and 434, and border area 436. Sticky area 433 can include an inner feature 435. Although the areas of sticky portions are described as discrete areas, it should be appreciated that these areas are identified as discrete areas solely for the purpose of describing the embodiment illustrated in FIG. 4D. The density of sticky areas generally increases in a gradient from the left side of the retention pad 430 near the cutout 431 to the right side of the retention pad 430.

The cutout 431 can correspond, generally, to the location of a matching feature on a tray associated with the retention pad 431 (e.g. FIG. 2B, element 150). The retention pad 430 can further include a border region 436 of sticky areas along its edges. In FIG. 4D, these border regions are illustrated as mostly-solid dark perimeter of the retention pad 430. The border region can securely hold an electronic device at its edges so that the device does not feel loose at any point. At the same time, because the border region is relatively thin at most points, the adhesive force can be overcome with reasonable effort.

The retention pad of FIG. 4D can have a generally even, parabolic-shaped gradient similar to that disclosed in conjunction with FIG. 4B, but can further include the inner feature 435. The retention pad can have a relatively low density of sticky portions in area 432 closest to the cutout 431. The retention pad can have a relatively higher or "medium" density of sticky portions in area 433 near the middle of the pad 430. The retention pad can have a relatively high or highest density of sticky portions in area 433 on a right side of the pad 430.

The inner feature 435, can be used to alter the release profile when an electronic device is removed from the provide. The inner feature 435 can generally be congruent to the parabolic gradient. In the embodiment of FIG. 4D, the inner feature 435 is also substantially parabolic. In embodiments where the inner feature 435 is a low-density of sticky portions such as shown in FIG. 4D, less force can be required to remove an electronic device compared to the embodiment of FIG. 4B or FIG. 4C.

From the perspective of the user peeling away a device starting near the cutout 431, initially, minimal force can be required to begin removal of an electronic device from the pad 430 because the cutout 431 represents a large area of no sticky portions and the density of sticky portions in area 432 is relatively low. However, when the device is partially removed, continued removal can require dramatically less force because of the mostly non-sticky inner feature 435 near the left side of area 433. Because of the generally parabolic shape of the inner feature 435, however, further removal of the electronic device from the pad 430 can need approximately constant force because, even though the size of the inner feature 435 decreases, there is less total sticky material remaining. The area 434 can include a very dense distribution of sticky material. Although the density can be very high, the total force required to remove the device from this last area 434 can be modest because the area is small in comparison to the total area of the retention pad 430 and because the user will have considerable mechanical advantage at this point. The high density of sticky material in the area 434 can act as an emergency stop to prevent an uncontrolled release of the electronic device from the retention pad 430.

Figure 4E:
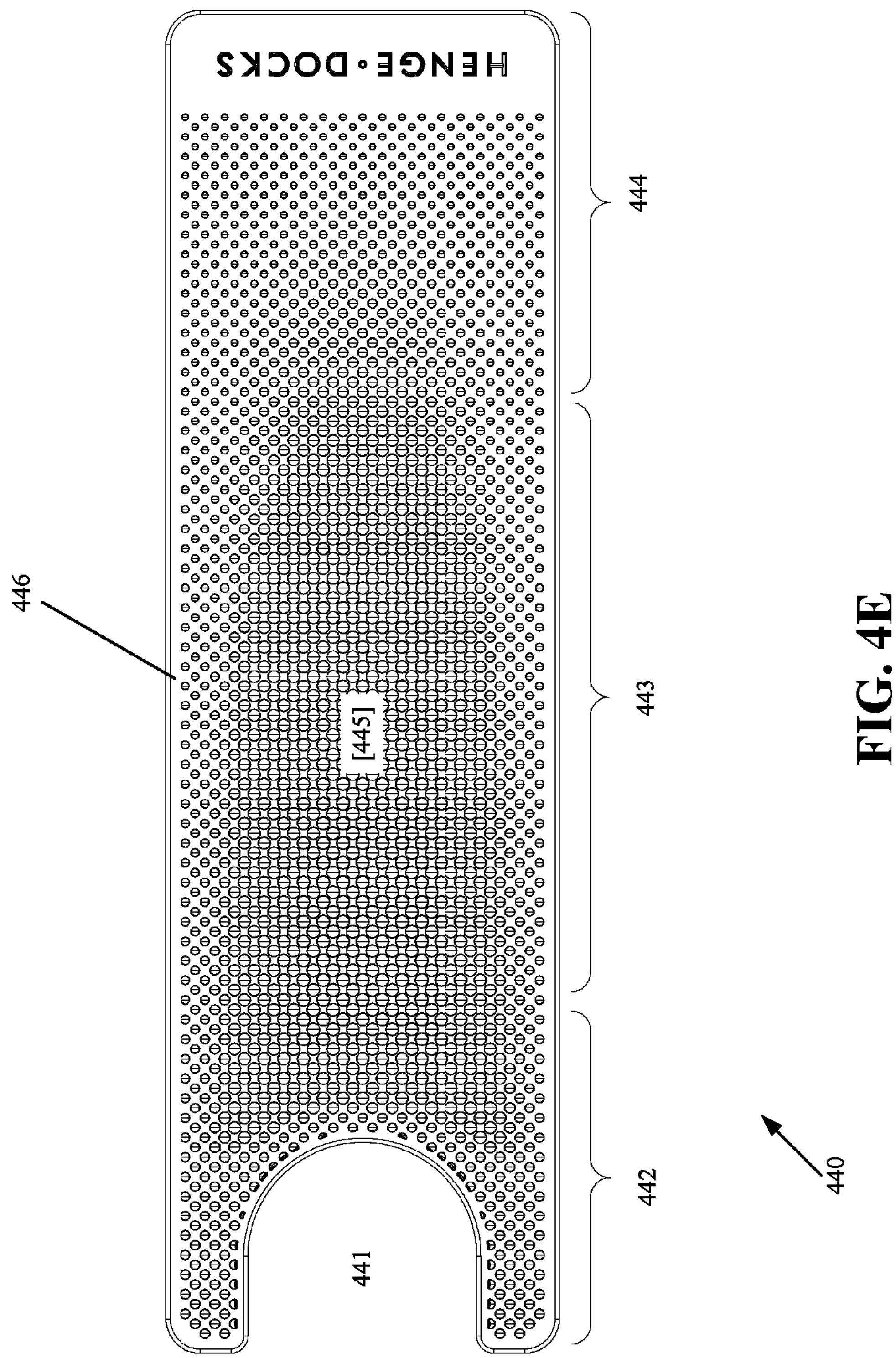
FIG. 4E is an illustration of a retention pad according to an embodiment of the invention.
Figure 4F:
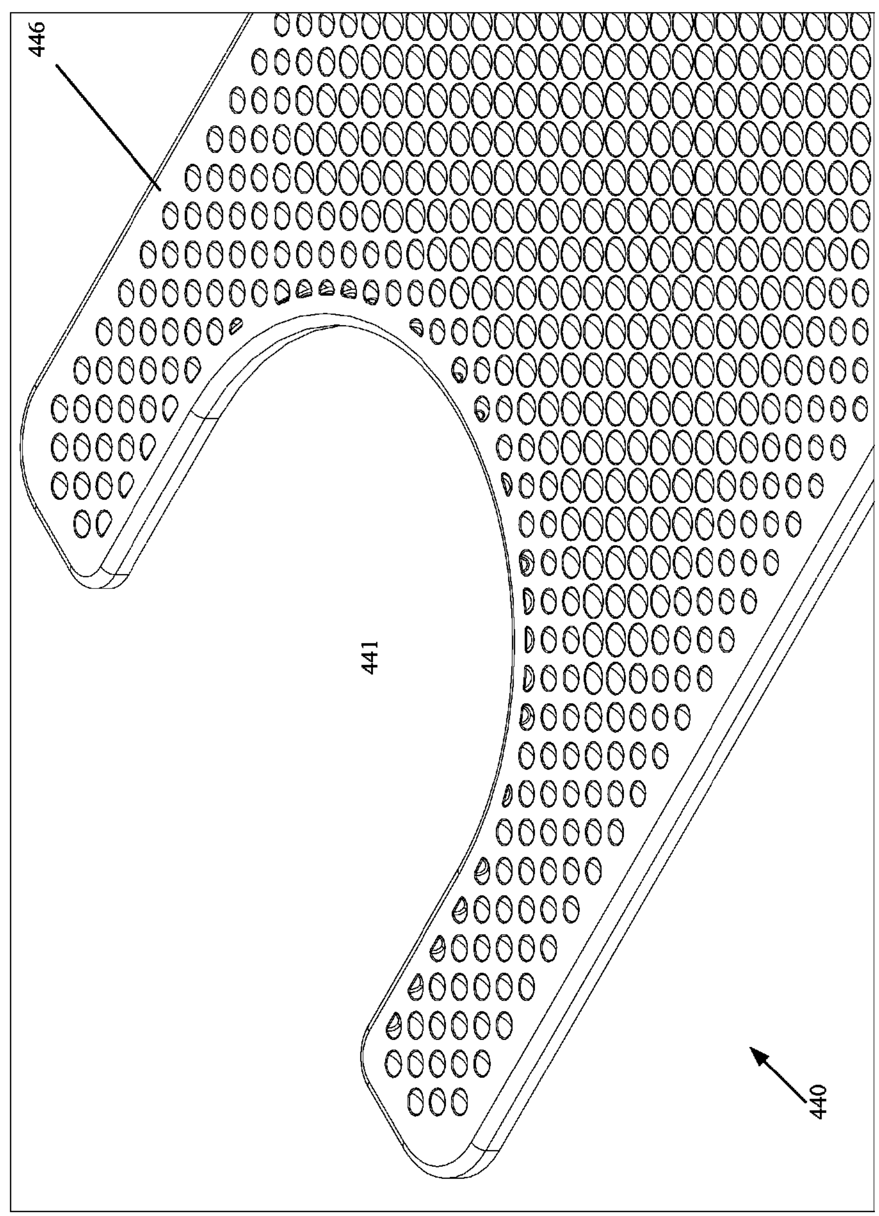
FIG. 4F is a detailed view of the retention pad of FIG. 4E.

FIG. 4E is an illustration of a retention pad according to an embodiment of the invention and FIG. 4F is a detailed view of the retention pad of FIG. 4E. As shown in FIG. 4E and FIG. 4F, a retention pad 440 can have a cutout 441, sticky areas 442, 443, and 444, and border area 446. Sticky area 443 can include an inner feature 445. Although the areas of sticky portions are described as discrete areas, it should be appreciated that these areas are identified as discrete areas solely for the purpose of describing the embodiment illustrated in FIG. 4E and FIG. 4F. The density of sticky areas generally increases in a gradient from the left side of the retention pad 440 near the cutout 441 to the right side of the retention pad 440.

The cutout 441 can correspond, generally, to the location of a matching feature on a tray associated with the retention pad 431 (e.g. FIG. 2B, element 150). The retention pad 440 can further include a border region 446 of sticky areas along its edges. In FIG. 4E and FIG. 4F, these border regions are illustrated as mostly white, featureless perimeter of the retention pad 440. The border region can securely hold an electronic device at its edges so that the device does not feel loose at any point. At the same time, because the border region is relatively thin at most points, the adhesive force can be overcome with reasonable effort.

In the embodiment of FIG. 4E and FIG. 4F, the white areas (not labeled) of the retention pad 440 can represent sticky areas and the circles (not labeled) can represent divots that form non-sticky areas. To create a gradient using divots, the diameter and density of divots can be varied. On a left side of the retention pad 440 near cutout 441 and in area 442, the divots can be relatively large in comparison to areas 443 and 444. This can create an area of low-stickiness and facilitate easy initiation of removal of the electronic device from the retention pad.

In middle area 443, the sticky areas can have two distinct patterns or gradients. First, the middle area 443 can continue the background gradient of large divots that started in the area 442 by decreasing the size divots. The decreased size of divots in the background gradient in area 443 results in a comparatively higher level or "medium" level of stickiness in the middle area 443. Second, the middle area 443 can further include the inner feature 445. In embodiments of the invention, the inner feature 445 can have a substantially parabolic shape. In embodiments of the invention, the inner feature 445 can be an area of high density of non-sticky portions (e.g. large divots). In other embodiments of the invention, the inner feature 445 can be an area of low density of non-sticky portions (e.g. small divots). The size of the divots and the corresponding density of sticky and non-sticky portions of the inner feature 445 can be chosen according to a release profile chosen by a designer. When the inner feature 445 is less sticky, it can be easier to remove an electronic device from the retention pad 440. When the inner feature 445 is more sticky, it can be harder to remove an electronic device from the retention pad 440.

In the right area 444, divots in the background gradient can be relatively smaller compared to areas 442 and 443. This can create an area of high stickiness and help prevent uncontrolled release of an electronic device from the retention pad 440.

The embodiments of FIG. 4E and FIG. 4F illustrate, generally, multiple concepts of the invention: first, that non-sticky areas of a retention pad can be formed with divots in addition to matte-finish; second, that a retention pad can have a background gradient that where there is a low density of sticky areas near a cutout and that the background gradient can gradually transition to an area of high density of sticky areas on the opposite side away from the cutout; third, that the retention pad can have an inner feature that can be used to vary the release profile of the retention pad; fourth, that the inner feature can have a generally parabolic shape; fifth, that the relative density of sticky areas can be different between the inside of the inner feature and the outside of the inner feature; and sixth, that the retention pad can have a border region of sticky material formed on a perimeter of the retention pad.

It will be apparent to those skilled in the art that various modifications and variations can be made in the retention system for an electronic device without departing from the spirit or scope of the invention. Thus, it is intended that embodiments of the invention cover the modifications and variations of this invention provided they come within the scope of the appended claims and their equivalents.

What is claimed is:

1. A retention system for an electronic device, the retention system comprising:

a substantially flat surface for receiving the electronic device;

a cutout in surface, the cutout in the surface sized in approximate proportions to allow an adult human finger to pass therethrough;

a retention pad on the flat surface, the retention pad having an interface surface for retaining the electronic device;

a design on the interface surface, the design comprising a plurality of adhesive portions and a plurality of non-adhesive portions;

a first side of the design;

a second side of the design opposite the first side; and
wherein a density of adhesive portions is less than a density of non-adhesive portions on the first side than the second side.

2. The retention system of claim 1 wherein the adhesive portions are further disposed in a gradient having generally parabolic shape.

3. A retention system for an electronic device, the retention system comprising:
a base member for receiving the electronic device;
a plurality of sidewalls at least partially surrounding the base member;
a cutout in base member, the cutout in the base member sized in approximate proportions to allow a human finger to pass therethrough;
a retention pad attached to the base member;
a cutout in the retention pad; the cutout in the retention pad sized and positioned, generally, to correspond with the cutout in the base member;
a plurality of adhesive portions of the retention pad; and
wherein the adhesive portions are dispersed, generally, in a gradient across the retention pad.

4. The retention system of claim 3 further comprising:
a plurality of non-adhesive portions of the retention pad.

5. The retention system of claim 4 wherein the retention pad is formed substantially from substantially from silicone, wherein the adhesive portions of the retention pad are formed from a glossy finish on the retention pad, and wherein the non-adhesive portions are formed from matte finish on the retention pad.

6. The retention system of claim 4 wherein the retention pad is formed substantially from substantially from silicone, wherein the non-adhesive portions are formed from divots in the retention pad.

7. The retention system of claim 3 wherein the gradient, generally, has a low density of adhesive portions close to the cutout in the retention pad; and
wherein the gradient, generally, has a high density of adhesive portions at an opposite side from the cutout in the retention pad.

8. The retention system of claim 3 wherein the gradient, generally, has a parabolic shape;
wherein the gradient, generally, has a low density of adhesive portions close to the cutout in the retention pad and inside the parabolic shape; and
wherein the gradient, generally, has a high density of adhesive portions outside the parabolic shape.

9. A retention system for an electronic device, the retention system comprising:
a base member for receiving the electronic device;
a cutout in base member, the cutout in the base member sized in approximate proportions to allow an adult human finger to pass therethrough;
a retention pad attached to the base member;
a plurality of adhesive portions of the retention pad; and
wherein the adhesive portions are dispersed, generally, in a gradient across the retention pad.

10. The retention system of claim 9 further comprising:
a plurality of non-adhesive portions of the retention pad.

11. The retention system of claim 10 wherein the adhesive portions of the retention pad have a glossy finish and the non-adhesive portions of the retention pad have a matte finish.

12. The retention system of claim 10 wherein the adhesive portions of the retention pad have a glossy finish and the non-adhesive portions of the retention pad are a plurality of recessed portions.

13. The retention system of claim 10 wherein the adhesive portions of the retention pad and the non-adhesive portions of the retention pad are form a substantially smooth surface.

14. The retention system of claim 9 wherein the gradient, generally, has a low density of adhesive portions close to the cutout in the retention pad; and
wherein the gradient, generally, has a high density of adhesive portions at an opposite side from the cutout in the retention pad.

15. The retention system of claim 14 further comprising:
a parabolic-shaped island of the retention pad.

16. The retention system of claim 9 wherein the gradient, generally, has a parabolic shape;
wherein the gradient, generally, has a low density of adhesive portions close to the cutout in the retention pad and inside the parabolic shape; and
wherein the gradient, generally, has a high density of adhesive portions outside the parabolic shape.

17. The retention system of claim 9 wherein the retention pad further comprises a border of adhesive material.

18. The retention system of claim 9 wherein the cutout in the base member is substantially circular.

19. The retention system of claim 9 wherein the cutout in the base member is a recess.

20. The retention system of claim 9 wherein the cutout in the base member intersects an edge of the base member.

21. The retention system of claim 9 wherein the cutout in the base member has a length that is at least three times a width of the cutout.

22. The retention system of claim 21 wherein the retention pad covers the cutout.

* * * * *